Nov. 15, 1960    F. HAALCK    2,959,961
GRAVIMETER

Filed March 5, 1957    2 Sheets-Sheet 1

INVENTOR
Fritz HAALCK
By F. D. Prajos
ATTORNEY

Nov. 15, 1960  F. HAALCK  2,959,961
GRAVIMETER
Filed March 5, 1957  2 Sheets-Sheet 2

INVENTOR.
Fritz HAALCK
BY
Samuel W. Kipnis
ATTORNEY

United States Patent Office 2,959,961
Patented Nov. 15, 1960

2,959,961

GRAVIMETER

Fritz Haalck, Berlin-Wilmersdorf, Germany, assignor to Askania-Werke A.G., a corporation of Germany Filed Mar. 5, 1957, Ser. No. 644,085

Claims priority, application Germany Mar. 10, 1956

2 Claims. (Cl. 73—382)

This invention relates to an instrument for measuring gravity by static and direct means, that is, without the use of a pendulum or the like. The invention relates particularly to a gravimeter of the spring suspension type.

A primary object of the invention is to provide for the measurement of most minute displacements of a spring suspended gravimeter mass, such as longitudinal displacements of the order of microns or micro-microns or correspondingly small angular displacements.

Another object is to make such measurement convenient, to allow the use of zero methods or direct methods, and to avoid certain drawbacks of hitherto used indicator arrangements, combined with photo-cells and the like.

Figure 1:
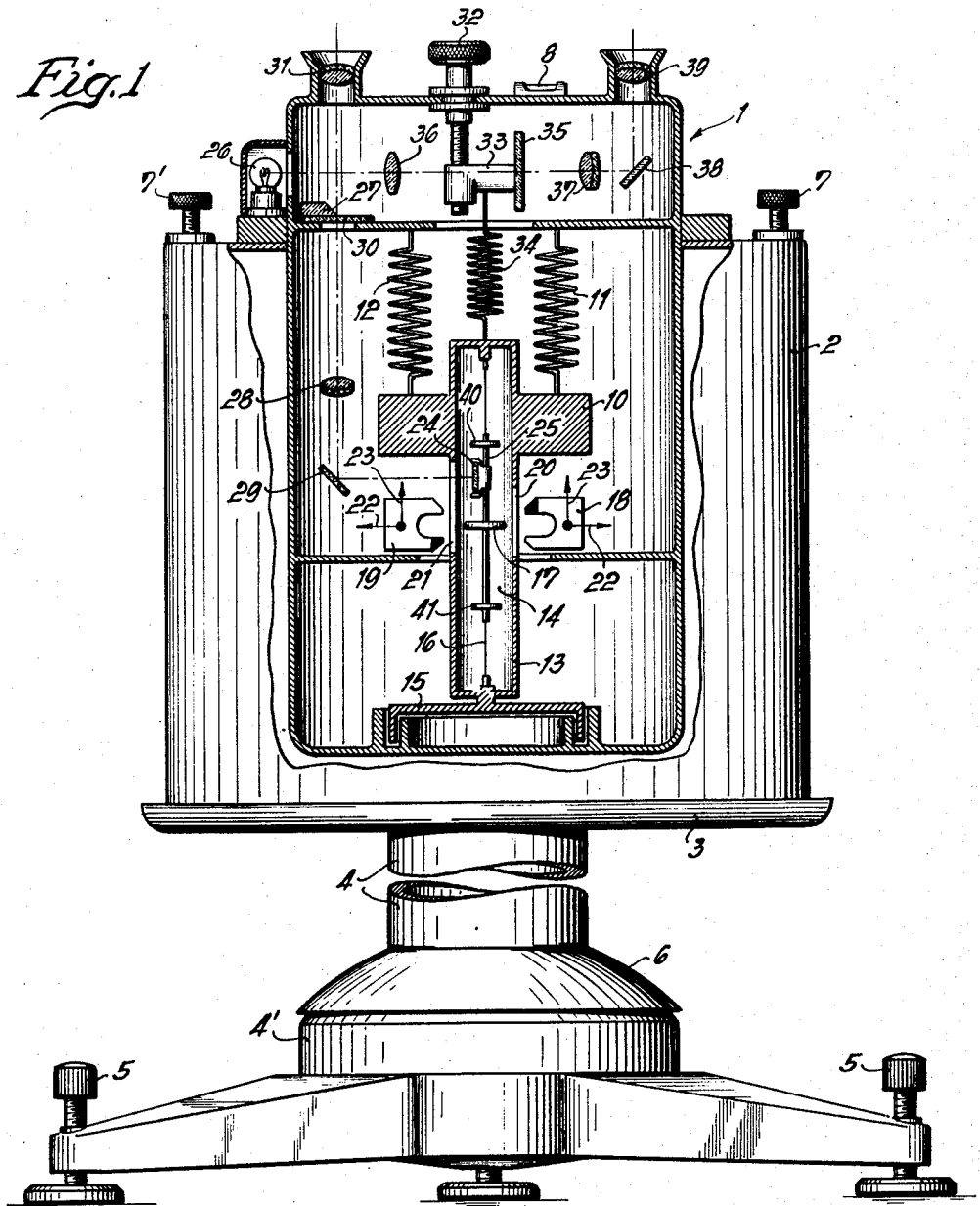
Figure 2A:
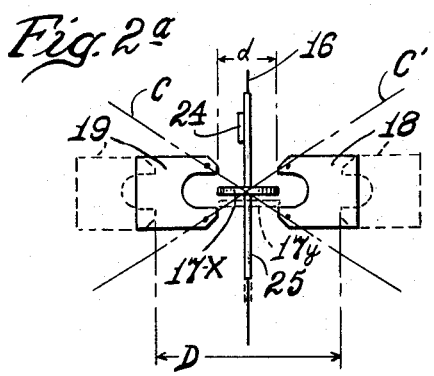
Figure 2C:
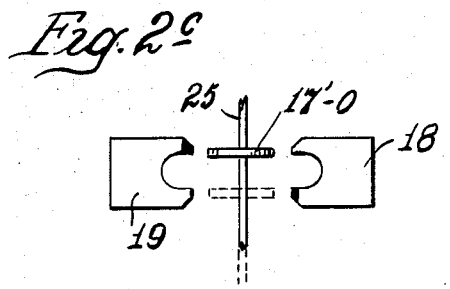
Figure 2B:
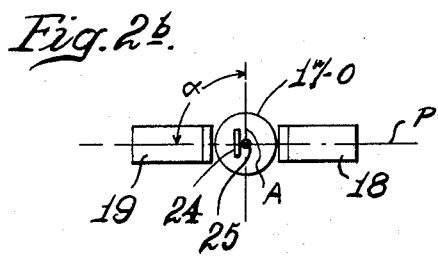
Figure 2D:
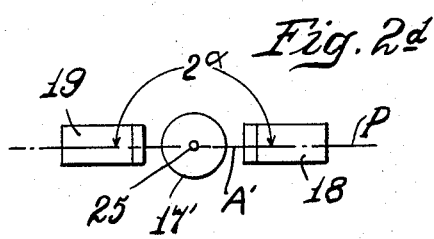
Figure 3:
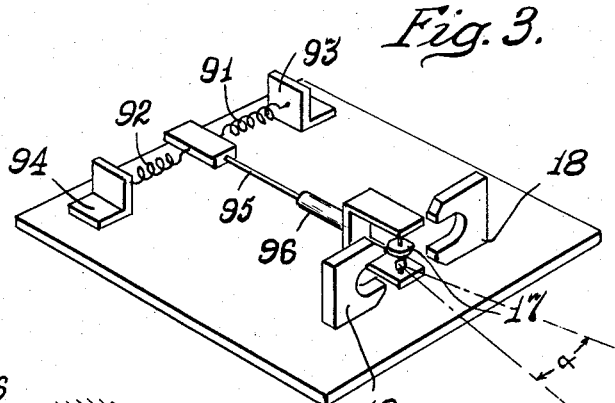
Figure 4:
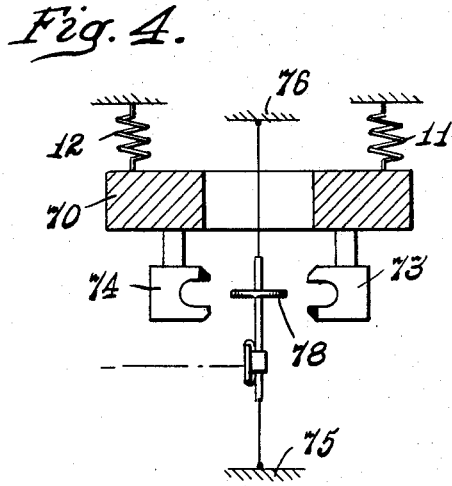

In the drawing, Figure 1 is a central, vertical, schematic section through a gravimeter according to the invention. Figure 2a is a detail from Figure 1 and Figure 2b is a plan view of the detail. Figure 2c is a modified detail and Figure 2d is a plan view of the modified detail. Figure 3 is a perspective view of a different gravimeter according to the invention; and Figure 4 is still another modified detail, in a view generally similar to that of Figure 2a.

The gravimeter system proper, identified in Figure 1 by numeral 1, is housed in an incubator 2 thermostatically controlled by well-known means, not shown, in order to avoid temperature fluctuations which could disturb parameters of the measuring system, mainly elasticity constants of the gravimeter springs. The incubator 2 with the system 1 therein rests on the table 3 of a tripod 4 which has foot screws 5 for coarse levelling and, for additional adjustment to sharply sloping grounds, a ball and socket joint 6 between the top and the lower part 4' of the tripod. For the finer levelling of the system 1, 2 on the table 3 secondary setscrews with adjusting knobs 7, 7' are provided, which extend upwardly through the incubator to provide for convenient top adjustment, with the aid of a spirit level or equivalent device 8.

The gravimeter system 1 comprises a gravimeter mass 10, attached by springs 11, 12 to the gravimeter frame in such a way that balance prevails between the force of gravity to be measured and the elastic reactions of the springs 11, 12. While longitudinally extendable coil springs are shown, which may be made of suitable metal or quartz or the like, it is equally possible to utilize a variety of other suspensions which may react to varying forces of gravity by corresponding tension, compression, bending, torsion or flexion. Typically, the weight or gravity of mass 10, measured by the system as by a kind of spring balance, may be subject to changes ranging from $10^{-5}$ to $10^{-7}$, leading to displacements typically ranging from $10^{-3}$ to $10^{-6}$ millimeters.

In order to evidence displacements of such minute magnitude there is provided, according to the invention, a cylindrical part 13 forming part of mass 10 and containing an indicator system 14. Undesired oscillations of the entire gravimeter mass 10, 13, 14 are damped by a pneumatic dash pot device 15. The cylindrical part 13 of the indicator serves as a frame for the securement of a torsion wire 16 supporting a torsionally displaceable magnet 17. This magnet is in magnetic circuit with a pair of stationary magnets 18, 19, which are so secured to the housing that each of them has superposed poles lying in a plane P containing the axis of wire 16 (Figure 2b); the pole arrangement being antisymmetric to said axis, about the center of the turning magnet 17; that is, the common centerlines C, C' of stationary poles of equal sign intersect one another in said center (Figure 2a). This arrangement of the stationary magnet poles produces a strongly inhomogeneous, magnetic field, which extends through apertures 20, 21 into the interior of indicator 14.

The following is characteristic of the described arrangement, if torsion wire 16 is so adjusted that the elastic force thereof biases the magnet 17 to a position 17–0 wherein the magnetic axis of this magnet is normal to the aforementioned plane P containing the four poles of magnets 18, 19. At one elevation 17–X of the gravimeter mass 10—which may be considered and used as zero position—the resultant of the magnetic moments of the stationary poles, relative to the rotatable magnet, is zero and the axis A of magnet 17 is then normal to said polar plane P; in Figures 1 and 2a, normal to the plane of the paper. Assuming now that the gravimeter mass is displaced vertically, by a change in the force of gravity acting on it, this causes a displacement of the rotatable magnet 17 to a point 17–Y of the inhomogeneous field where the magnetic moments have a resultant causing the rotatable magnet to turn, against the elastic forces of the torsion wire 16.

The magnitude of the excursion of the magnet can be varied by modifying the distance d between the poles of the two magnets 18, 19 as shown in Figure 2a at D. Thus it is desirable to make these magnets adjustable horizontally as well as vertically, by adjusting means, not shown, which operate in directions 22, 23 (Figure 1). These means are used also for the calibration of the instrument. The maximum excursion α of the rotatable magnet, with zero position 17–0 normal to the pole plane as described, is 90° (Figure 2b). In order to obtain measurable excursions in case of small changes of gravity, the inhomogeneity of the magnetic field can be increased by suitable horizontal adjustment of the stationary magnets. Thus a most minute vertical displacement, which is not practically measurable by other methods, already causes a substantial torsional movement of the magnet, thereby greatly facilitating gravimetric indication.

Such indication is effected by an autocollimation mirror 24, rigidly secured at 25 to magnet 17 and rotating with this magnet (Figure 1). A light beam from a lamp 26 is guided by suitable means, not shown, to a prism 27. It is then guided by prism 27, objective 28 and reflector 29 to the mirror 24, which can be observed via 30 in an ocular 31, wherein the position of the beam can be compared with a graduated dial.

The measurement is desirably effected according to the zero method, that is, by measurably returning the gravimeter mass 10 from the position changed by the change of gravity to the normal zero position. For this purpose a vernier screw 32 has a vertically movable slider 33, said slider being secured to one end of a preferably soft and delicate spring 34, the other end of which is secured to the mass 10. The return of this mass to zero position can be checked in ocular 31; and the extent of the returning movement is evidenced on a dial 35, illuminated by a lamp 26 via system 36 and observed by reading microscope 37, 38 with ocular 39.

A characteristic feature of the measuring procedure according to this invention is that the rotating magnet 17, when under the influence of the inhomogeneous field, is subject to forces acting in the direction in which the mass 10 is displaced, said forces accordingly tending to add to the displacement. Thus the system 17, 18, 19 is more or less astatic.

The accuracy of the described gravimeter of course would be reduced if geomagnetic disturbance were not eliminated; and special shielding is therefore provided. It comprises, aside from a magnetic shield, a pair of auxiliary magnets 40, 41 on the rigid member 25 secured to indicating magnet 17. These auxiliary magnets serve to eliminate any residual influence of the geomagnetic field upon the rotating magnet 17, which could disturb the controlling force derived from the torsion of the wire 16.

Many modifications are of course possible. For instance as shown in Figure 2d, the magnetic axis A' of the magnet rotor 17' can be caused to be parallel to the pole plane P, in zero position 17'-0 (Figure 2c) in which case a 180° excursion 2α can be obtained. The type of suspension spring used, as mentioned can be changed widely; and it is a matter of indifference what path is followed by the center of gravity of the gravimeter mass, and how the displacement of this mass is transformed into displacements of the turning magnet. It is possible, for instance (Figure 3) to support the gravimeter mass 96 on a lever 95 swingable about a horizontal pivot 93, 94, which lever may have for instance torsion springs 91, 92 for biasing it to a zero position; and it is likewise possible (Figure 4) to mount the field magnets 73, 74 on the gravimeter mass 70 and to make the frame 75, 76 of the torsion magnet 78 stationary. The field magnets are desirably formed of cores of high magnetomotive force, with suitably formed pole shoes mounted thereon.

I claim:

1. In a gravimeter: a magnet rotatable in a substantially horizontal plane; torsion means carrying said magnet; field magnet means for maintaining a strongly inhomogeneous field in a substantially vertical plane containing the axis of the torsion means; a gravimeter mass, for displacing the torsion means relative to the field magnet means, in said vertical plane; elastic suspension means for the mass to hold it, subject to such displacing in response to changes of gravity; and means for determining the angular position of the magnet in the horizontal plane.

2. A gravimeter as described in claim 1 wherein the means for determining angular position comprises an autocollimator mirror rigidly secured to the magnet; means for directing a light beam onto said mirror; and telescope means for comparing the position of the beam reflected by the mirror with a dial scale.

References Cited in the file of this patent

UNITED STATES PATENTS

| | | |
|---|---|---|
| Re. 20,137 | Hartley | Oct. 20, 1936 |
| 1,774,516 | Kilchling | Sept. 2, 1930 |
| 2,137,963 | Heiland | Nov. 22, 1938 |
| 2,159,082 | Hartley | May 23, 1939 |
| 2,301,396 | Graf | Nov. 10, 1942 |
| 2,389,866 | Moore | Nov. 27, 1945 |
| 2,463,414 | Nelson | Mar. 1, 1949 |
| 2,660,062 | Frowe | Nov. 24, 1953 |